United States Patent [19]

Yamamoto

[11] Patent Number: 4,884,778
[45] Date of Patent: Dec. 5, 1989

[54] ATTACHMENT STRUCTURE OF A STEERING COLUMN

[75] Inventor: Yoshimi Yamamoto, Shizuoka, Japan

[73] Assignee: Fujikiko Kabushiki Kaisha, Tokyo, Japan

[21] Appl. No.: 188,248

[22] Filed: Apr. 29, 1988

[30] Foreign Application Priority Data

Apr. 30, 1987 [JP]   Japan .................................. 62-106926

[51] Int. Cl.$^4$ ............................................. B62D 1/16
[52] U.S. Cl. ...................................... 248/548; 74/492; 248/900
[58] Field of Search .................. 248/548, 900; 74/492; 188/376; 280/777; 403/2; 411/1, 2, 368–370, 903, 542

[56] References Cited

U.S. PATENT DOCUMENTS

| | | | |
|---|---|---|---|
| 2,756,795 | 7/1956 | Clingman | 411/150 |
| 3,394,613 | 7/1968 | Curtindale | 74/492 |
| 3,415,140 | 12/1968 | Bien et al. | 74/492 |
| 3,476,345 | 11/1969 | Ristau | 248/548 |
| 3,707,096 | 12/1972 | Bennett | 74/492 |
| 3,747,427 | 7/1973 | Milton et al. | 74/492 |
| 3,813,960 | 6/1974 | Windett et al. | 74/492 |
| 3,868,864 | 3/1975 | Durkee et al. | 74/492 |
| 4,102,217 | 7/1978 | Yamamoto et al. | 74/492 |
| 4,194,411 | 3/1980 | Manabe et al. | 74/492 |
| 4,715,756 | 12/1987 | Danico et al. | 411/542 X |

FOREIGN PATENT DOCUMENTS

| | | | |
|---|---|---|---|
| 2653377 | 7/1977 | Fed. Rep. of Germany | 74/492 |
| 2003996 | 11/1969 | France . | |
| 1300284 | 12/1972 | United Kingdom . | |
| 1322234 | 7/1973 | United Kingdom . | |

Primary Examiner—Alvin C. Chin-Shue
Attorney, Agent, or Firm—Foley & Lardner, Schwartz, Jeffery, Schwaab, Mack, Blumenthal & Evans

[57] ABSTRACT

An attachment structure of a steering column comprises a bracket fixed to a steering jacket for receiving a steering shaft and attaching the steering jacket to a chassis, the bracket being attached to the chassis through metallic contact faces; and a capsule disposed in an attaching portion of the bracket attached to the chassis and having metallic and resin sliders which overlap each other through the bracket and attaches the bracket to the chassis such that the bracket is detachable from the metallic and resin sliders through metallic and resin contact faces.

An attachment structure of a steering column may comprise a bracket for attaching the steering column to a base; metallic and resin sliders fitted to each other to support the bracket therebetween; a device for preventing the relative movement between the resin slider and the bracket; and a fastener for attaching the bracket to the base through the metallic and resin sliders in a state in which the relative movement between the resin slider and the bracket is prevented.

8 Claims, 5 Drawing Sheets

ATTACHMENT STRUCTURE OF A STEERING COLUMN

The present invention relates to an attachment structure of a steering column, and in particular, to an attachment structure of a steering column in which a steering jacket is detached from an attaching portion of a chassis at the colliding time of a vehicle, and is contracted in the axial direction of the steering shaft.

BACKGROUND OF THE INVENTION

A steering column for a vehicle is divided into upper and lower shafts, and is constructed to be contracted in the direction of the steering shaft when a driver hits his chest, etc., on the steering wheel and an impact force is applied to his chest at the colliding time, etc., thereby relaxing the impact force.

FIG. 1 shows an attachment structure of a conventional steering column. A shaft column 2 is divided into upper and lower shafts within a jacket 1. When a steering wheel 5 is pressed in the direction of arrow A, the upper shaft compresses a buffer portion within the jacket 1, and is moved together with the jacket 1 in the direction of arrow A, thereby contracting the shaft column. The jacket 1 is supported by the bracket 3 fastened by a bolt 6 to a chassis 4.

FIGS. 2 and 3 respectively show an enlarged perspective view and a cross-sectional view of the bracket 3 and a fastening portion thereof. A notch 8 is formed in a flange portion 7 of the bracket 3, and small holes 9 for receiving shear pins are disposed around the notch 8. A capsule 10 having an H shape in cross section is fitted into the notch 8, and has a bolt hole 11 in a central portion thereof. Small holes 13 for receiving shear pins are formed in a flange portion 12 of the capsule 10. Shear pins 14 made of synthetic resin are inserted and fixed into the small holes 9 and 13.

In such a structure mentioned above, the jacket 1 is fastened by bolts to the chassis 4 through the bracket 3 and the capsule 10, thereby completely fixing the jacket 1 to the chassis. However, the bracket 3 and the capsule 10 are fixed to each other through the shear pins 14 and the fitting frictional force therebetween. Accordingly, when a strong impact force in the direction of arrow A is applied to the steering wheel 5, the shear pins 14 are broken, and the bracket 3 is detached from the capsule 10 while holding the jacket 1, thereby contracting the shaft column 2 by a contracting mechanism within the jacket and relaxing the impact force.

However, in the attachment structure of the steering column mentioned above, there are the following problems.

To facilitate the detachment of the bracket 3 at the colliding time, it is necessary to form clearance S by increasing distance L between the upper and lower flange portions 12 of the capsule 10 with respect to thickness t of the flange portion 7 of the bracket 3, so that the steering wheel is rattled, causing some problems in the operation of the vehicle.

When the capsule 10 and the bracket 3 are closely fitted to each other, the frictional force therebetween is increased, and it is thereby not easy to smoothly detach the bracket 3 from the capsule 10.

In particular, the pressing force from the steering wheel is normally applied in the horizontal direction, there causes a problem with respect to the frictional force between the upper face of the flange portion 7 of the bracket 3 and the lower face of the upper flange portion 12 of the capsule 10, in which the bracket 3 might not be detached from the capsule 10 at an emergency time since the frictional coefficient thereof is extremely high when they are made of metal such as iron, aluminum, etc.

Further, the occurrence of the collision of the vehicle is not limited on the front side thereof, but a slanting force is often applied to the vehicle. In such a case, a secondary impact force from the steering wheel has a slanting direction, causing a problem with respect to the frictional force between side faces of the notch 8 and the capsule 10.

To solve the problems mentioned above, it is considered to make the capsule of synthetic resin, but a creep is generated when the capsule made of synthetic resin is fastened by bolts, reducing the durabilitiy of the structure and causing problems in safety.

SUMMARY OF THE INVENTION

To solve the problems mentioned above, an object of the present invention is to provide an attachment structure of a steering column for smoothly detaching a jacket from a capsule when an impact force is applied to the steering column, and reliably fixing the jacket to the capsule at the normal time.

With the above object in mind, the present invention resides in an attachment structure of a steering column comprising bracket means fixed to a steering jacket for receiving a steering shaft and attaching the steering jacket to a chassis, said bracket means being attached to the chassis through metallic contact faces; and capsule means disposed in an attaching portion of the bracket means attached to the chassis and having metallic and resin sliders which overlap each other through the bracket means and attaches the bracket means to the chassis such that the bracket means is detachable from the metallic and resin sliders through metallic and resin contact faces.

An attachment structure of a steering column may comprise bracket means for attaching steering means to base means for supporting the steering column; metallic and resin slider means fitted to each other to support the bracket means therebetween; means for preventing the relative movement between the resin slider means and the bracket means; and fastening means for attaching the bracket means to the base means through the metallic and resin slider means in a state in which the relative movement between the resin slider means and the bracket means is prevented.

BRIEF DESCRIPTION OF THE DRAWINGS

The present invention will be more apparent from the following description of the preferred embodiments thereof in conjunction with the accompanying drawings in which.

DETAILED DESCRIPTION OF THE PREFERRED EMBODIMENTS

The preferred embodiments of the present invention will be now described with reference to the accompanying drawings.

Figure 1:
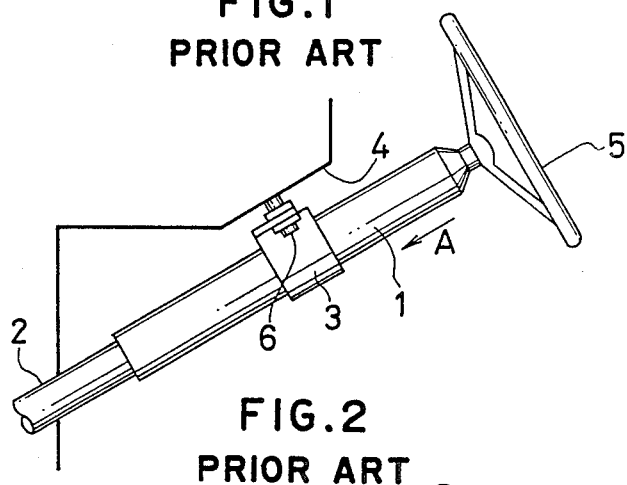
FIG. 1 is a side view of a conventional steering column.
Figure 2:
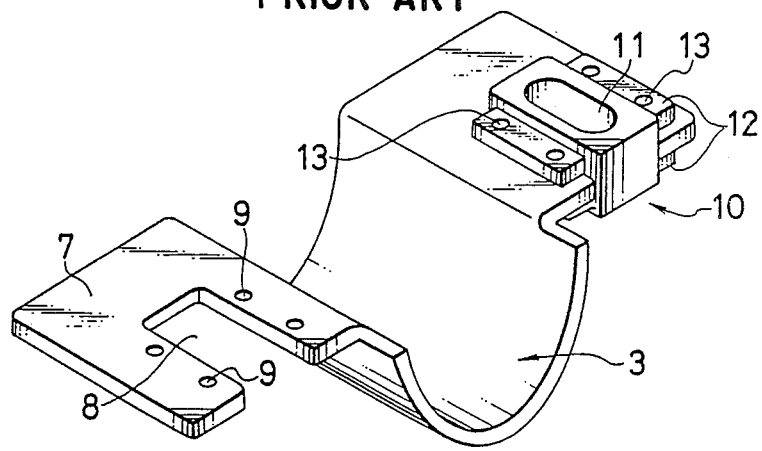
FIG. 2 is a perspective view of an attachment structure of the conventional steering column of FIG. 1.
Figure 3:
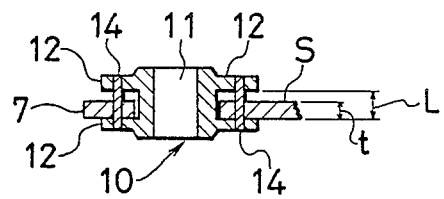
FIG. 3 is a cross-sectional view of the attachment structure of FIG. 2.
Figure 4:
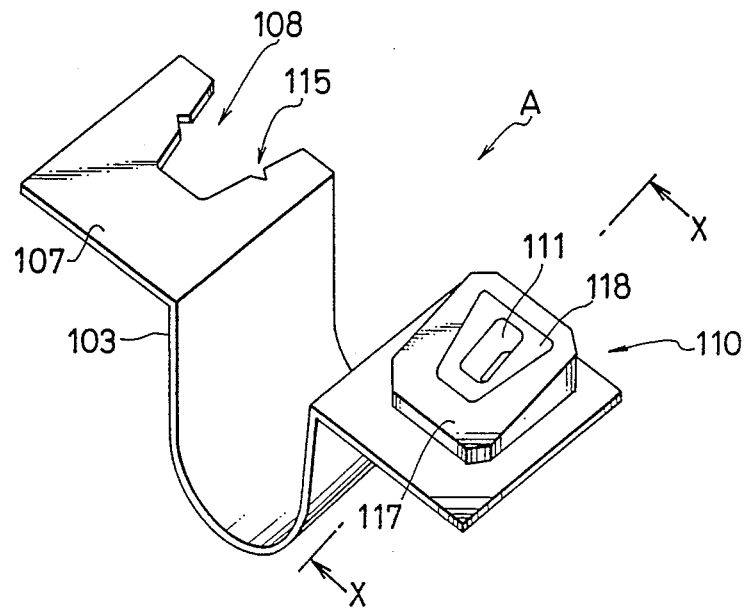
FIG. 4 is a perspective view of the whole construction of an attachment structure of a steering column in accordance with one embodiment of the present invention.
Figure 5:
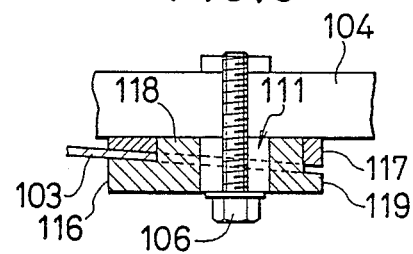
FIG. 5 is a cross-sectional view of the attachment structure taken along line X—X of FIG. 4.
Figure 6:
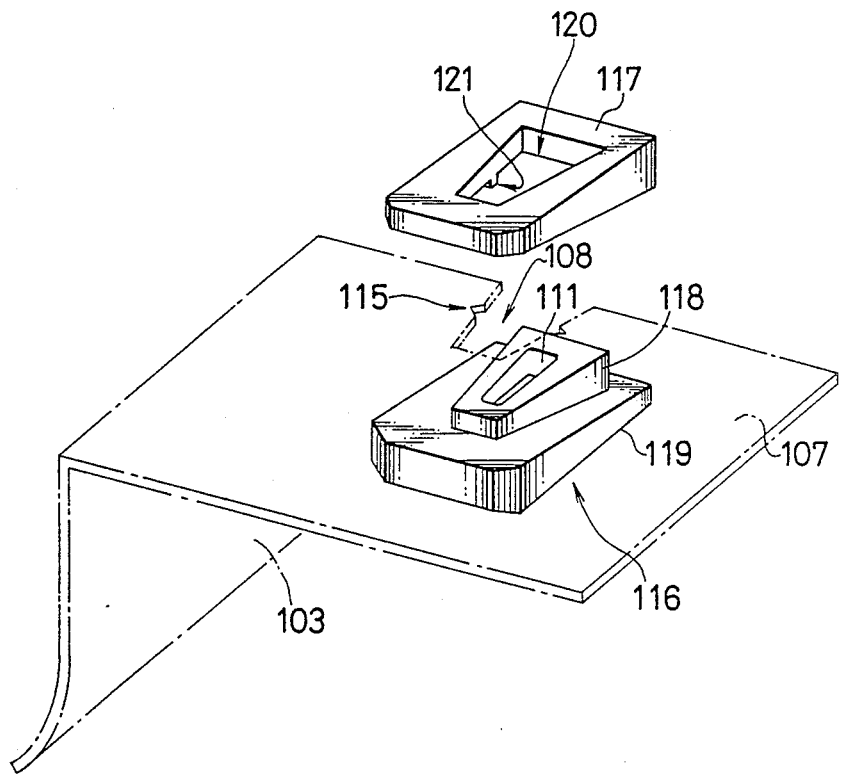
FIG. 6 is a perspective view of the attachment structure when the structure is assembled.
Figure 7:
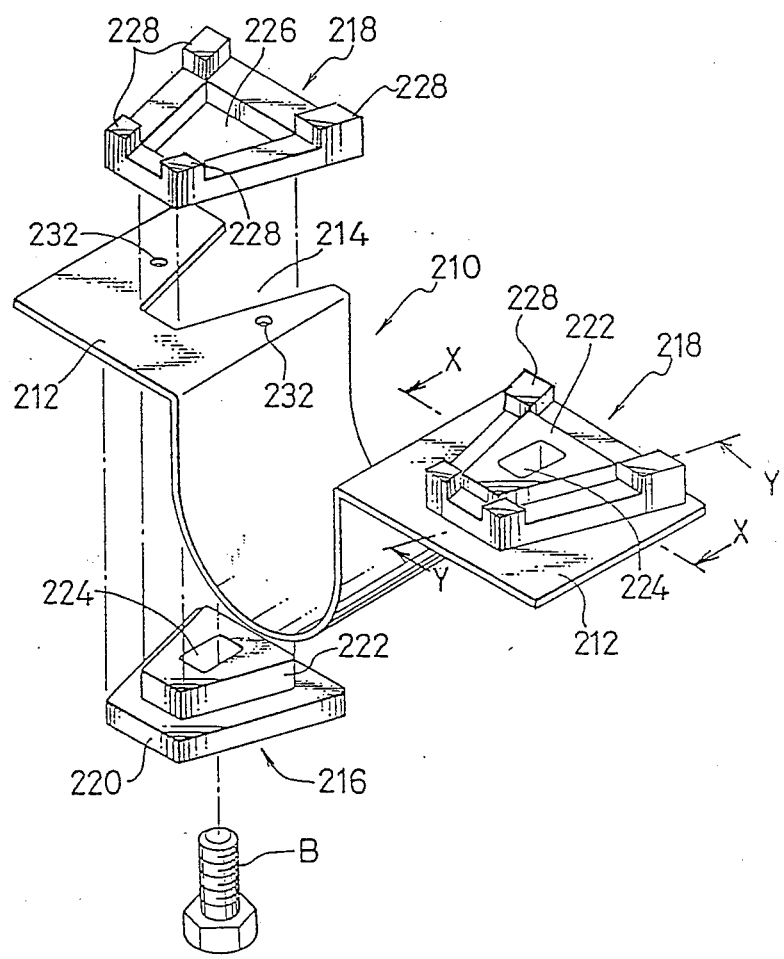
FIG. 7 is a perspective view showing the whole construction of an attachment structure of a steering wheel in another embodiment of the present invention.

As shown in FIGS. 4 to 6, a trapezoidal notch 108 having a width gradually increasing on a steering wheel side is formed in a flange portion 107 of a bracket 103, and small notches 115 are disposed on both sides of the notch 108.

A capsule 110 is divided into a metallic slider 116 and a resin slider 117. The metallic slider 116 has a projecting portion 118 in a central portion thereof, and the projecting portion 118 has a bolt hole 111 formed in a central portion thereof. A base portion 119 of the metallic slider 116 has a taper gradually thinner on the steering wheel side, and the projecting portion 118 has a taper gradually thicker on the steering wheel side. The upper face of the projecting portion 118 is substantially parallel to the bottom face of the base portion 119. The projecting portion 118 has the same planar shape as the trapezoidal shape of the notch 108.

The contour of the resin slider 117 is the same as that of the base portion 119 of the metallic slider 116, and has a hole 120 disposed in a central portion thereof and receiving the projecting portion 118 of the metallic slider 116. The resin slider 117 further has small projections 121 on both sides of the hole 120.

When the bracket 103 is attached to the capsule 110, the projecting portion 118 of the metallic slider 116 is first inserted into the notch 108 from the lower side of the bracket 103, and the projecting portion 118 projecting upwards is fitted into the hole 120 of the resin slider 117. As a result, a peripheral portion of the notch 108 of the bracket 103 is held by the metallic slider 116 and the resin slider 117 therebetween, and the small projections 121 of the resin slider 117 are also fitted into the small notches 115 of the bracket 103. Then, a bolt 106 is inserted into the bolt hole 120, and the bracket 103 is fastened to the chassis 104 by screwing a nut into the bolt 106.

In this state, the fastening force of the bolt 106 is applied to only the metallic slider 116, thereby generating no creep in the structure and reliably fixing the bracket 103 to the chassis 104.

When a secondary impact force is applied by collision, etc., to the structure from the steering wheel in the direction of arrow A, the bracket 103 is pressed in the direction of arrow A in FIG. 4, so that the small projections 121 made of resin are broken through the small notches 115 and the bracket 103 is moved out of the clearance between the metallic and resin sliders 116 and 117. At this time, the pressing force is applied to the structure in the horizontal direction, and the strongest frictional force is applied onto the upper face of the bracket 103 normally made of iron or aluminum and the lower face of the resin slider 117. However, the frictional coefficient of the resin and metal is low, and thereby the bracket 103 and the capsule 110 are easily detached from each other. Further, the notch 108 has a trapezoidal shape, and the metallic and resin sliders 116 and 117 have tapers in the thickness direction thereof as shown in FIGS. 5 and 6 so that the bracket 103 and the capsule 110 are further easily detached from each other.

As mentioned above, the attachment structure of a steering column in accordance with the present invention has the following effects.

(1) Since the bracket made of metal is fixed to a chassis through metallic faces, there is no creep in the structure and the structure is firmly constructed and safe.

(2) When the bracket is detached from the capsule, the bracket and the capsule frictionally contact each other through metallic and resin faces, and the frictional coefficient thereof is low so that the bracket and the capsule can be easily detached from each other.

FIGS. 7 to 11 show another embodiment of the present invention. In these figures, a trapezoidal notch 214 is disposed in each of flange portions 212 of a bracket 210 on both sides thereof, and the width of the notch 214 axially increases towards the steering wheel side. A metallic slider 216 is disposed on the lower side of the notch 214, and a resin slider 218 is disposed on the upper side of the notch 214. A peripheral portion of the notch 214 is supported by both sliders 216 and 218 therebetween.

The metallic slider 216 is composed of a block made of aluminum, for example, and comprises a trapezoidal flange portion 220 having a size larger than that of the notch 214, a trapezoidal projecting portion 222 integrally projected from a central portion of the flange portion 220, and an elongated bolt hole 224 extending through the projecting portion 222 in the upward and downward directions.

Figure 8:
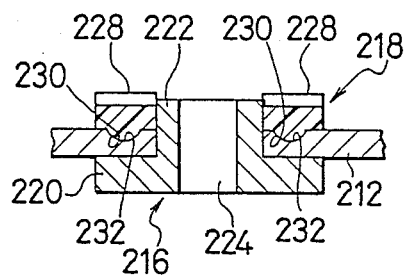
FIG. 8 is a cross-sectional view of the attachment structure taken along line X—X of FIG. 7.
Figure 9:
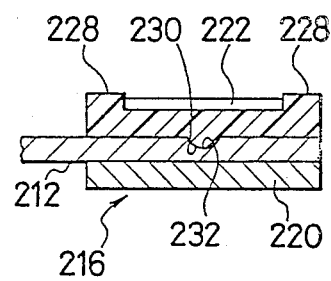
FIG. 9 is a cross-sectional view of the attachment structure taken along line Y—Y of FIG. 7.

The resin slider 218 has the same trapezoidal shape as the flange portion 220, and a trapezoidal opening 226 disposed in a central portion thereof and fitted to the projecting portion 222. The resin slider 218 further has projecting portions 228 at the four upper corners thereof and slightly projected from the projecting portion 222 in a state in which the resin slider 218 is fitted onto the projecting portion 222 of the metallic slider 216 through the bracket 210. As shown in FIG. 8, a pair of small projections 230 are formed on the lower faces of connecting portions between the projecting portions 228 on both sides thereof.

The respective small projections 230 are disposed corresponding to recessed portions 232 formed on both sides of each of the notches 214 in the flange portions 212 of the bracket 210, and are fitted to the recessed portions 232 in a state in which both the sliders 216 and 218 are overlapped through the bracket 210.

Figure 10A:
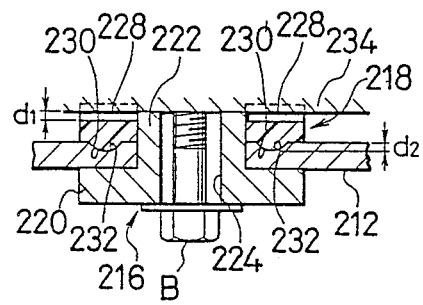
FIG. 10A is a cross-sectional view corresponding to FIG. 8 showing the fastening state of a bolt.
Figure 10B:
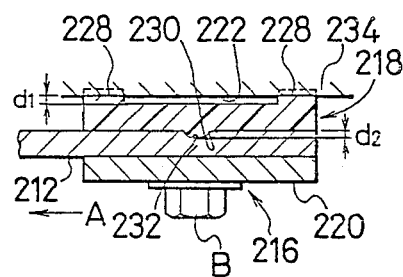
FIG. 10B is a cross-sectional view corresponding to FIG. 9 showing the fastening state of the bolt.

In the attaching structure mentioned above, a bolt B is inserted into the bolt hole 224 in a state in which the flange portion 212 of the bracket 210 is supported by the sliders 216 and 218 therebetween, and is then screwed into a chassis 234. Thus, the respective projecting portions 228 make in contact with the chassis 234, and as shown in FIGS. 10A and 10B, the top surface of the projecting portion 222 of the metallic slider 216 makes in contact with the chassis 234 in a state in which the projections 228 are elastically deformed in the flat shape by the fastening force of the bolt B, thereby providing a firm coupling state by the contact between the metallic portions.

In such a coupling state, the small projections 230 are fitted to the recessed portions 232. A predetermined clearance $d_1$ is formed between the chassis 234 and the connecting portions of the resin slider 218 except for the projecting portions 228 opposing the chassis 234. The clearance $d_1$ is set to be greater than fitted depth $d_2$ of the small projections 230.

When a secondary impact force is applied by collision, etc., to the structure from the steering wheel in the direction of arrow A, the bracket 210 is pressed in the direction of arrow A.

Figure 11:
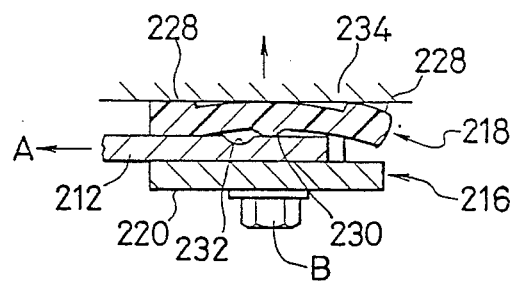
FIG. 11 is a cross-sectional view corresponding to FIG. 9 showing a state in which small projections are moved out of recessed portions.

When the impact force exceeds the fitted strength between the small projections 230 and the recessed portions 232, the central portion of the resin slider 218 is moved upwards and elastically deformed as shown in FIG. 11, so that the small projections 230 are moved out of the recessed portions 232. In this state, the lower face of the resin slider 218 mainly makes in frictional contact with the flange portion 212 most strongly. However, the frictional coefficient between the resin and the metal is low, and thereby the small projections 230 can be easily moved out of the recessed portions 232. The separation of the small projections 230 from the recessed portions 232 can be further facilitated by the trapezoidal shape of the notch 214.

As mentioned above, the attachment structure in accordance with this embodiment of the present invention has the following effects.

(1) Since the metallic slider is fastened by a bolt to a chassis through metallic contact portions, these members are firmly coupled to each other. Accordingly, even when a creep is formed in the resin slider by the fastening force of the bolt, the structure is not rattled by the fitting between the small projections and the recessed portions formed on the bracket side, and the axial force of the bolt is not lowered.

(2) When a collision in the steering wheel occurs, the small projections are moved out of the recessed portions by the elasticity of the resin. In this state, the bracket is mainly moved by the frictional force between the resin and the metal, which is small so that the bracket can be reliably detached from the chassis by an impact force greater than a predetermined force.

What is claimed is:

1. An attachment structure of a steering column comprising:
   metallic bracket means for attaching a steering shaft to a chassis;
   resin slider having a hole and contacting said metallic bracket means with a low frictional coefficient;
   metallic slider fitted into the hole of the resin slider and supporting said metallic bracket means in cooperation with said resin slider;
   said metallic bracket means being detachable from a space between said metallic and resin sliders by the low frictional coefficient between said resin slider and said metallic bracket means when an excessive impact force is applied to the steering shaft in the axial direction thereof; and
   fastening means inserted into the hole of said resin slider, contacting said metallic slider, and fixing said metallic bracket means to the chassis through metallic contact faces of said metallic slider and the chassis such that a fastening force is applied only to said metallic slider.

2. An attachment structure as claimed in claim 1, wherein the bracket means has a notch for receiving at least one of said metallic and resin sliders, and said fastening member passes through the notch and said metallic and resin sliders.

3. An attachment structure as claimed in claim 1, wherein said metallic and resin sliders are respectively tapered in opposite directions at an interface defined by the space between said metallic and resin sliders.

4. An attachment structure as claimed in claim 3, wherein one of said metallic and resin sliders is tapered to be gradually thinner towards the steering wheel, and the other is tapered to be gradually thicker towards the steering wheel.

5. An attachment structure as claimed in claim 1, wherein said bracket means has a small notch, and said resin slider has a projection fitted into the small notch of the bracket means, and the projection is constructed to be broken when an impact force greater than a predetermined force is applied to the steering column.

6. An attachment structure as claimed in claim 1, further comprising projected and recessed portions disposed in said resin slider and said bracket and fitted to each other to prevent the relative movement therebetween.

7. An attachment structure as claimed in claim 6, wherein the projected and recessed portions of said resin slider and said bracket can be disengaged from each other when the impact force is greater than a predetermined force.

8. An attachment structure as claimed in claim 1, wherein said metallic slider has a projecting portion fitted into the hole of said resin slider through a notch of the bracket.

* * * * *